(12) United States Patent
Suzuki

(10) Patent No.: US 7,558,836 B2
(45) Date of Patent: Jul. 7, 2009

(54) INFORMATION PROCESSING SYSTEM, INFORMATION PROCESSING DEVICE, INFORMATION PROCESSING METHOD, INFORMATION PROCESSING PROGRAM, AND REMOTE CONTROLLER TERMINAL

(75) Inventor: Naoya Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 09/928,353

(22) Filed: Aug. 14, 2001

(65) Prior Publication Data

US 2002/0026494 A1 Feb. 28, 2002

(30) Foreign Application Priority Data

Aug. 21, 2000 (JP) ............... 2000-250142

(51) Int. Cl.
*G06F 15/16* (2006.01)
*G06F 15/173* (2006.01)

(52) U.S. Cl. ....................... 709/217; 709/225
(58) Field of Classification Search ................. 709/200
See application file for complete search history.

(56) References Cited

U.S. PATENT DOCUMENTS

| 5,729,220 | A  | * | 3/1998 | Russell .................... 341/22 |
| 6,216,158 | B1 | * | 4/2001 | Luo et al. .................. 709/217 |
| 6,263,319 | B1 | * | 7/2001 | Leatherman ................. 705/30 |
| 6,405,049 | B2 | * | 6/2002 | Herrod et al. ............... 455/517 |
| 6,448,958 | B1 | * | 9/2002 | Muta ....................... 345/169 |
| 6,654,601 | B2 | * | 11/2003 | Picoult et al. ............. 455/412.1 |
| 6,662,244 | B1 | * | 12/2003 | Takahashi .................... 710/14 |
| 6,744,528 | B2 | * | 6/2004 | Picoult et al. ............. 358/1.15 |
| 6,757,543 | B2 | * | 6/2004 | Moran et al. ............. 455/456.1 |
| 6,779,047 | B1 | * | 8/2004 | Caddes et al. ................ 710/15 |

FOREIGN PATENT DOCUMENTS

| EP | 0 794 642 A2 | 9/1997 |
| EP | 0 797 338 A2 | 9/1997 |
| JP | 2000-10548 | 1/2000 |
| WO | WO 99/60782 | 11/1999 |
| WO | WO 00/18025 | 3/2000 |

OTHER PUBLICATIONS

Dusan Zivadinovic, "Endlich gewappnet", CT Magazin Fuer Computer Technik, No. 22, XP-000880740, Oct. 25, 1999, pp. 122-123.

* cited by examiner

*Primary Examiner*—John B. Walsh
(74) *Attorney, Agent, or Firm*—Oblon, Spivak, McClelland, Maier & Neustadt, P.C.

(57) ABSTRACT

A remote controller terminal uses a function item information receiving unit to receive function item information representing functions of an information terminal device to be operated, which is directly transmitted from the information terminal device, and uses a processing command transmitting unit to directly transmit a processing command corresponding to the received function item information to the information terminal device in accordance with user's input operation, and the device uses a processing command receiving unit to receive the processing command directly transmitted from the remote controller terminal, and uses a control unit to control the function corresponding to the processing command in order to execute predetermined processing in accordance with the instructions from the remote controller terminal without having a wired connection.

7 Claims, 8 Drawing Sheets

INFORMATION PROCESSING SYSTEM, INFORMATION PROCESSING DEVICE, INFORMATION PROCESSING METHOD, INFORMATION PROCESSING PROGRAM, AND REMOTE CONTROLLER TERMINAL

BACKGROUND OF THE INVENTION

1. Field of the Invention

The present invention relates to an information processing system, an information processing device, an information processing method, an information processing program, and a remote controller terminal, and more particularly, is suitably applied to an information processing system comprising a digital portable telephone and a notebook personal computer.

2. Description of the Related Art

In an information processing system, a serial interface is installed in each of a digital portable telephone and a notebook personal computer, and a serial cable is used to connect these serial interfaces so that the digital portable telephone and the notebook personal computer can communicate various data with each other.

In the information processing system constructed as above, the serial cable connects the digital portable telephone and the notebook personal computer, therefore the digital portable telephone and the notebook personal computer can not communicate various data with each other if the serial cable does not connect them, which causes a usability problem for a user.

SUMMARY OF THE INVENTION

In view of the foregoing, an object of this invention is to provide an information processing system, an information processing device, and information processing method, an information processing program and a remote controller terminal which offer further excellent operability.

The foregoing object and other objects of the invention have been achieved by the provision of an information processing system comprising a remote controller terminal and an information processing device. The remote controller terminal comprises a function item information receiving means for receiving function item information corresponding to each function had by the information processing device which is operated, from the information processing device by radio, and a processing command transmitting means for transmitting a processing command corresponding to the function item information to the information processing device by radio in accordance with user's input operation. The information processing device comprises a processing command receiving means for receiving the processing command transmitted from the remote controller terminal, and a control means for controlling the function corresponding to the processing command to execute predetermined processing corresponding to the user's input operation to the remote controller terminal.

In addition, the information processing device comprises a function item information transmitting means for transmitting function item information corresponding to own functions to a remote controller terminal by radio, a processing command receiving means for receiving a processing command corresponding to the function item information transmitted from the remote controller terminal by radio, and a control means for controlling the function corresponding to the processing command to execute predetermined processing in accordance with instructions from the remote controller terminal.

Further, the present invention provides an information processing method comprising a function item information transmitting step of transmitting function item information corresponding to own functions to a remote controller terminal by radio, a processing command receiving step of receiving a processing command corresponding to the function item information transmitted from the remote controller terminal, and a control step of controlling the function corresponding to the processing command to execute predetermined processing in accordance with instructions from the remote controller terminal.

Still further, the present invention provides an information processing program to be executed by an information processing device, which comprises a function item information transmitting step of transmitting function item information corresponding to own functions to a remote controller terminal by radio, a processing command receiving step of receiving a processing command corresponding to the function item information transmitted from the remote controller terminal, and a control step of controlling the function corresponding to the processing command to execute predetermined processing in accordance with instructions from the remote controller terminal.

Still further, The remote controller terminal comprises a function item information receiving means for receiving function item information corresponding to functions had by an information processing device to be operated, from the information processing device by radio, and a processing command transmitting means for transmitting a processing command corresponding to the function item information to the information processing device by radio in accordance with user's input operation.

According to the present invention as described above, the remote controller terminal uses the function item information receiving means to receive function item information representing functions of the information processing device to be operated, which is directly transmitted from the information processing device, and uses the processing command transmitting means to directly transmit a processing command corresponding to the received function item information to the information processing device in accordance with user's input operation. The information processing device uses the processing command receiving means to receive the processing command directly transmitted from the remote controller terminal, and uses the control means to control the function corresponding to the processing command in order to execute predetermined processing in accordance with instructions from the remote controller terminal. As a result, the information processing device can be remotely operated with the remote controller terminal without having a wired connection, thus making it possible to significantly improve the operability.

The nature, principle and utility of the invention will become more apparent from the following detailed description when read in conjunction with the accompanying drawings in which like parts are designated by like reference numerals or characters.

DETAILED DSECRIPTION OF THE EMBODIMENT

Preferred embodiments of this invention will be described with reference to the accompanying drawings:

(1) Whole Structure of Information Processing System

Figure 1:
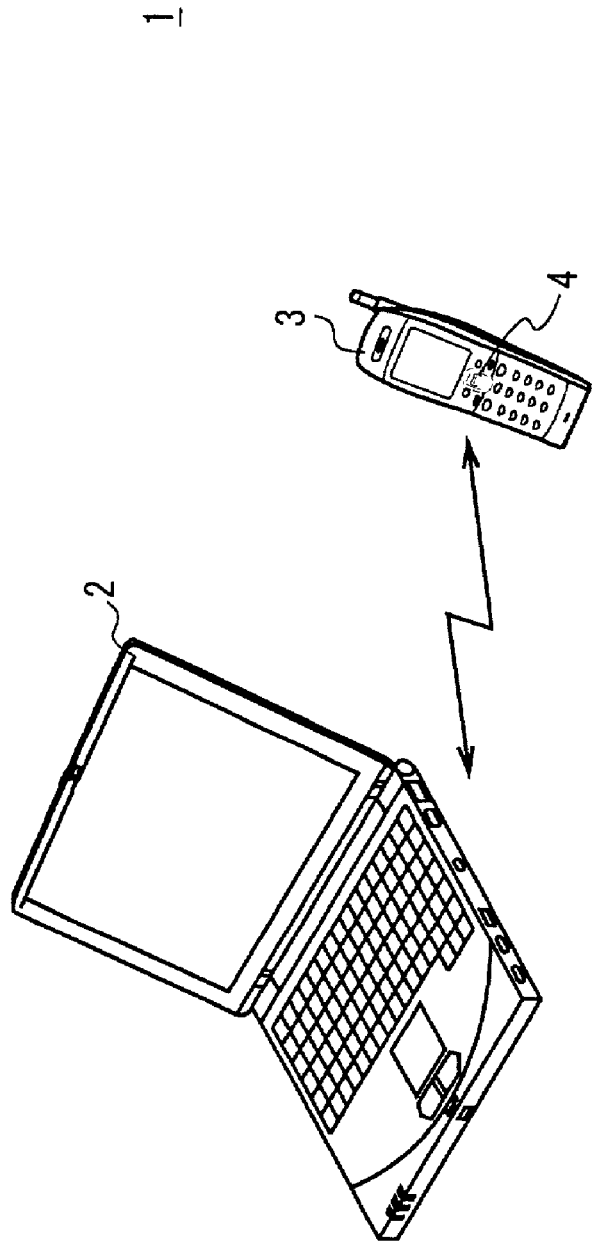
FIG. 1 is a schematic diagram showing the whole structure of an information processing system of the present invention.

In FIG. 1, a reference numeral 1 shows an information processing system which comprises a notebook personal computer and a digital portable telephone 3. And the notebook personal computer 2 and the digital portable telephone 3 can perform communication with each other by a radio communication method based on a radio communication standard called the Bluetooth (trademark).

Note that, the Bluetooth is the radio data communication standard for short distance standardized by the Bluetooth special interest group (SIG) which is a standardizing group, in which 79 channels each having a bandwidth of 1 MHz are set within the industrial scientific medical (ISM) of 2.4 GHz bandwidth, a spread spectrum communication method utilizing a frequency hopping method which switches channels 1600 times per one second is used to perform data communication within 10 m at data transmission rate of 1 Mbit/sec (actual rate of 721 kbit/sec).

(1-1) Structure of Personal Computer

Figure 2:
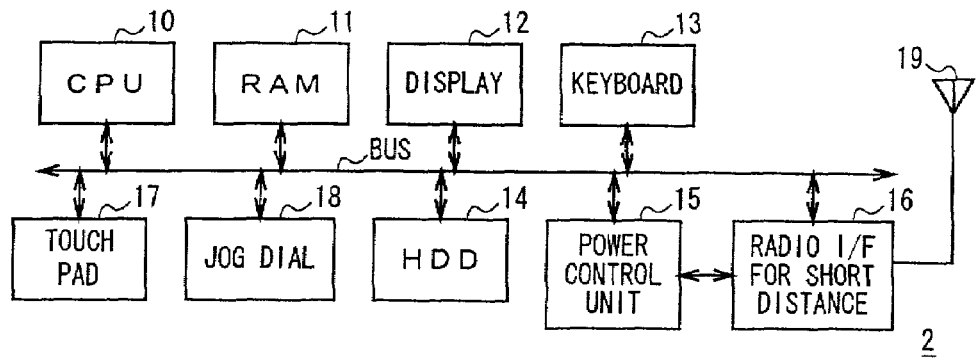
FIG. 2 is a block diagram showing a circuit structure of a notebook personal computer.

As shown in FIG. 2, the notebook personal computer 2 has such a structure that a random access memory (RAM) 11, a display 12 that is a liquid crystal display, a keyboard 13, a hard disk drive (HDD) 14, a power control unit 15, a radio interface for short distance 16 based on the Bluetooth standard, a touch pad 17 and a jog dial 18 are connected to each other with a data bus BUS, so as to communicate various data between these units through the data bus BUS.

Note that, the jog dial 18 is formed on the side surface of the notebook personal computer 2 as an operation means which is capable of easily carrying out system setting and various functions of various application software through rotation operation and pushing operation.

The HDD 14 stores various kinds of programs including an operating system program such as the Windows 98 (trademark of Microsoft corp.) and a jog dial utility program, and various kinds of personal information databases.

The CPU 10 takes out various programs stored in the HDD 14 when necessary, opens and executes them on the RAM 11 to control each unit, thereby performing various processing, and it displays the processing results on the display 12.

When the notebook personal computer 2 is driven, the CPU 10 opens the jog dial utility program as well as an operating system program, on the RAM 11.

Figure 3:
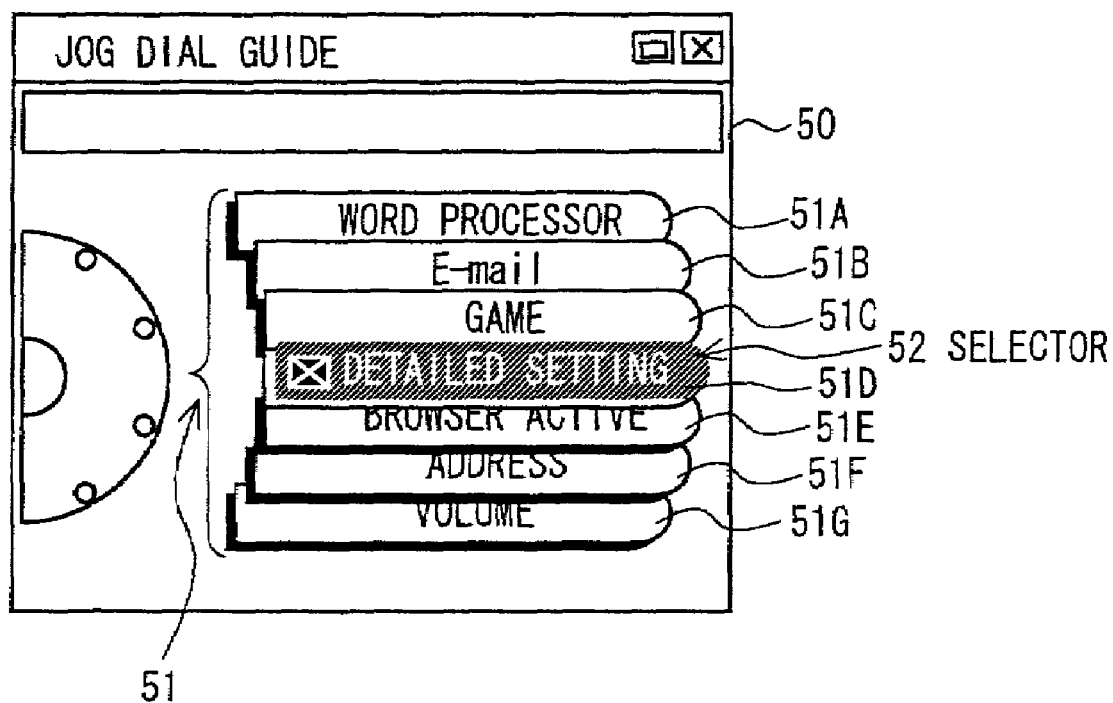
FIG. 3 is a schematic diagram showing an example of a jog dial window display.

Thereby the CPU 10 displays, for example, a jog dial window 50 shown in FIG. 3 on the display 12, and at the same time virtually displays the contents of the rotation operation and the pushing operation of the jog dial 18 on the jog dial window 50, to show a user an operated situation.

That is, when the jog dial 18 is rotated, the CPU 10 rotatably displays main menu items 51 in accordance with the rotation operation on the jog dial window 50, and on the other hand when the jog dial 18 is pushed the CPU 10 determines the item being selected by a selector (inverse color part) 52 and executes the processing corresponding to the item.

The power control unit 15 controls the power supply to each unit of the notebook personal computer 2, and always supplies power to only the radio interface for short distance 16 even when the notebook personal computer 2 is in an inactive mode (that is, in a sleep mode), so it is always active even the notebook personal computer 2 is in an inactive mode.

When the notebook personal computer 2 receives a driving signal from the digital portable telephone 3 via the radio interface for short distance 16, it outputs a driving command to the power control unit 15 even in an inactive mode, to reactive.

Such a notebook personal computer 2 previously stores an identification ID used for judging whether a digital portable telephone 3 is owned by a proper user of the notebook personal computer 2, in order to prevent the remote control by a digital portable telephone 3 owned by a third party.

Further, the notebook personal computer 2 previously sets items which can be remotely operated with the digital portable telephone 3 out of the main menu items 51 of the jog dial window 50 displayed on the display 12, so as to perform processing corresponding to the set items.

In actual, in the case of setting items, the user rotates the jog dial 18 so as to place the selector 52 on a detailed setting item 51D out of the main menu items 51 on the jog dial window 50 (FIG. 3), and then pushes the jog dial 18.

Figure 4A:
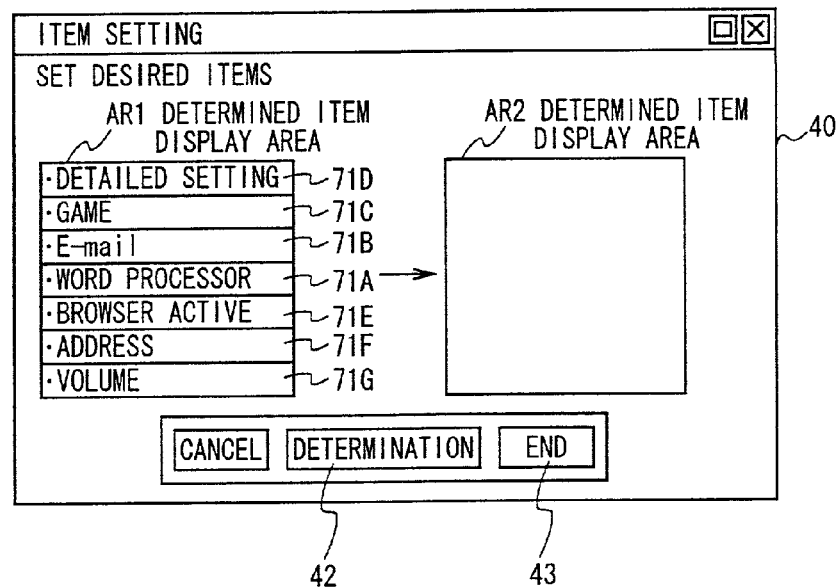
FIGS. 4A and 4B are schematic diagrams showing examples of an item setting screen.

Thereby, the notebook personal computer 2 displays on the display 12 an item setting screen 40 in which main menu items 71 corresponding to the main menu item 51 of the jog dial window 50 (FIG. 3) is shown in a setting item display area AR1, as shown in FIG. 4A, and allows the user to set items to be transmitted to the digital portable telephone 3 using the determined item display area AR2.

The user performs setting using the jog dial 18 or a mouse pad 17 this time, and selects and then determines an E-mail item 71B and an address item 71F as items which can be remotely operated with the digital portable telephone 3, out of the main menu items 71 including a word processing unit item 71A, the E-mail item 71B, a game item 71C, a detailed setting item 71D, a browser activating item 71E, the address item 71F and a volume item 71G, displayed in the setting item display area AR1.

Figure 4B:
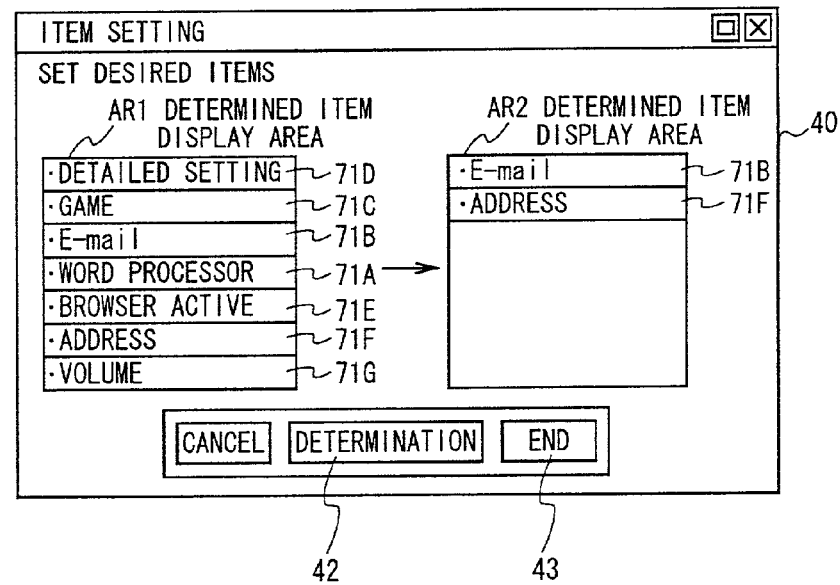

Then, the notebook personal computer 2 copies and displays the E-mail item 71B and the address item 71F in the determined item display area AR2 on the item setting screen 40 as shown in FIG. 4B, and operation of an end button 43 by the user terminates the setting processing for items to be transmitted to the digital portable telephone 3. Thereby the notebook personal computer 2 stores the setting contents of the set items in the HDD 14.

In this way, the notebook personal computer 2 previously stores the identification ID and the setting contents for items which can be remotely operated with the digital portable telephone 3, in the HDD 14, and performs radio data communication with a close digital portable telephone 3 (FIG. 1) which can be used in the Bluetooth, via the radio interface for short distance 16 and the antenna 18.

(1-2) Structure of Digital Portable Telephone

Figure 5:
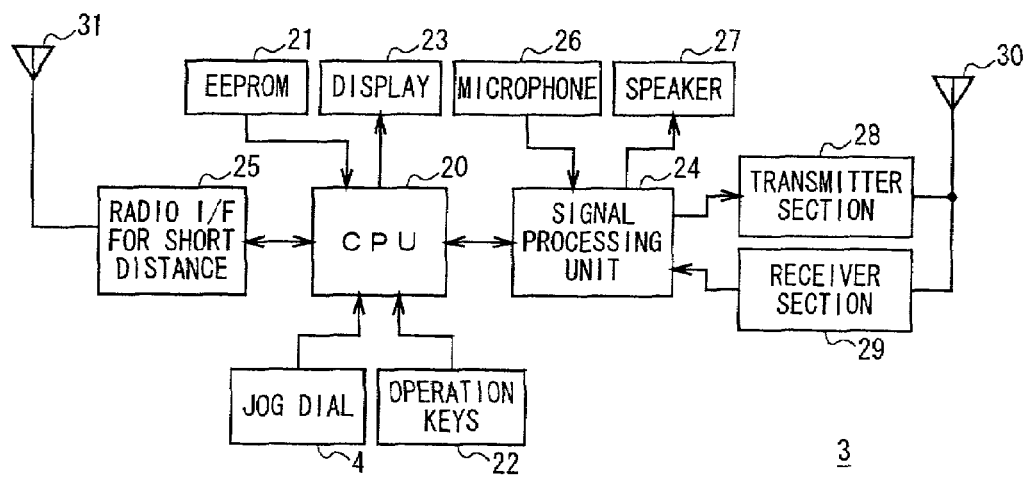
FIG. 5 is a block diagram showing a circuit structure of a digital portable telephone.

As shown in FIG. 5, in the digital portable telephone 3, an electronic erasable program read-only memory (EEEPROM) 21, a jog dial 4, a plurality of operation keys 22, a display 23 which is a liquid crystal display, a signal processing unit 24, and radio interface for short distance 25 based on the Bluetooth standard are connected to a CPU 20 for controlling the whole performance of the digital portable telephone 3, and a microphone 26, a speaker 27, a transmitter section 28 and a receiver section 29 are connected to the signal processing unit 24.

Note that, similarly to the jog dial 18 of the notebook personal computer 2 as described in FIG. 2, the jog dial 4 of the digital portable telephone 3 is an operation means for easily carrying out system setting and various functions in various application software by rotation operation and pushing operation.

Further, the EEPROM 21 stores various programs such as a jog dial state managing program, and personal information including an identification ID which is used to realize communication of various kinds of information with a notebook personal computer 2.

The CPU 20 takes out various programs stored in the EEPROM 21, when necessary, to control each unit, and thereby performs various processing, and then displays the processing results on the display 23 according to the processing.

When the digital portable telephone 3 is driven, the CPU 20 takes out the jog dial state managing program from the EEPROM 21 to detect an amount of change in rotation of the jog dial 4 by polling which is performed every 5 minutes and to always detect whether the jog dial 4 has been pushed.

Therefore, the CPU 20 displays various kinds of information (entered telephone numbers or menu items, or a calling history or a telephone directory, for example) corresponding to the command information entered through the jog dial 4 or the operation keys 22, on the display 23. Further, the CPU 20 controls the signal processing unit 24 in accordance with the command information entered through the jog dial 4 or the operation keys 22, to perform various kinds of processing according to the command information such as call processing and call ending processing.

In actual, the digital portable telephone 3 is a code division multiple access (CDMA) scheme cellular portable telephone under the direct sequence (DS) system based on the IS95 standards, and during conversation, the signal processing unit 24 performs error correction and then convolutional coding on an audio signal inputted vial the microphone 26, and then performs frequency diffusion by multiplying a pseude noise (PN) code, and modulates the resultant, in order to generate a transmission symbol stream which is then inputted to the transmitter section 28. The transmitter section 28 performs the digital/analog conversion on the transmission symbol stream to generate a transmission signal, then performs the frequency conversion processing and amplification processing on the transmission signal, then the resultant is outputted via the antenna 30.

On the other hand, the receiver section 29 performs the amplification processing and then the frequency conversion processing on the received signal received via the antenna 30, then performs the analog/digital conversion to generate a reception symbol stream which is then inputted to the signal processing unit 24. The signal processing unit 24 demodulates the reception symbol stream, then performs the back-diffusion by multiplying a PN code and furthermore, performs the maximum likelihood estimation processing using the convolutional code and then error detection processing in order to generate an audio signal which is then outputted to the speaker 27.

Further, the signal processing unit 24 transmits a control signal to the base station (not shown) via the transmitter section 28 and the antenna 30 to perform call processing and on the other hand, receives the call-arrival signal via the antenna 30 and the receiver section 29 and informs the CPU 20 of the call arrival.

The CPU 20 controls the signal processing unit 24, to perform radio data communication with another communication terminal connected to the public circuit via the transmitter section 28, the receiver section 29 and the antenna 30.

Note that, the digital portable telephone 3 may utilize the global system for mobile communication (GSM) system, or the time division multiple access (TDMA) scheme, in addition to the CDMA system and also may utilize the international mobile telecommunication system (IMT)-2000 system which is the next-generation cellular phone system.

By the way, the digital portable telephone 3 has a remote control start key which is included in the plurality of operation keys 22, and when the remote control start key is pressed, the signal processing unit 24 and the radio interface for short distance 25 exchange various kinds of communication data under the control of the CPU 20.

Therefore, the digital portable telephone 3 can perform radio data communication with a close notebook personal computer 2 (FIG. 1) which can be used in the Bluetooth, via the antenna 31.

(2) Remote Operation Processing

Figure 6:
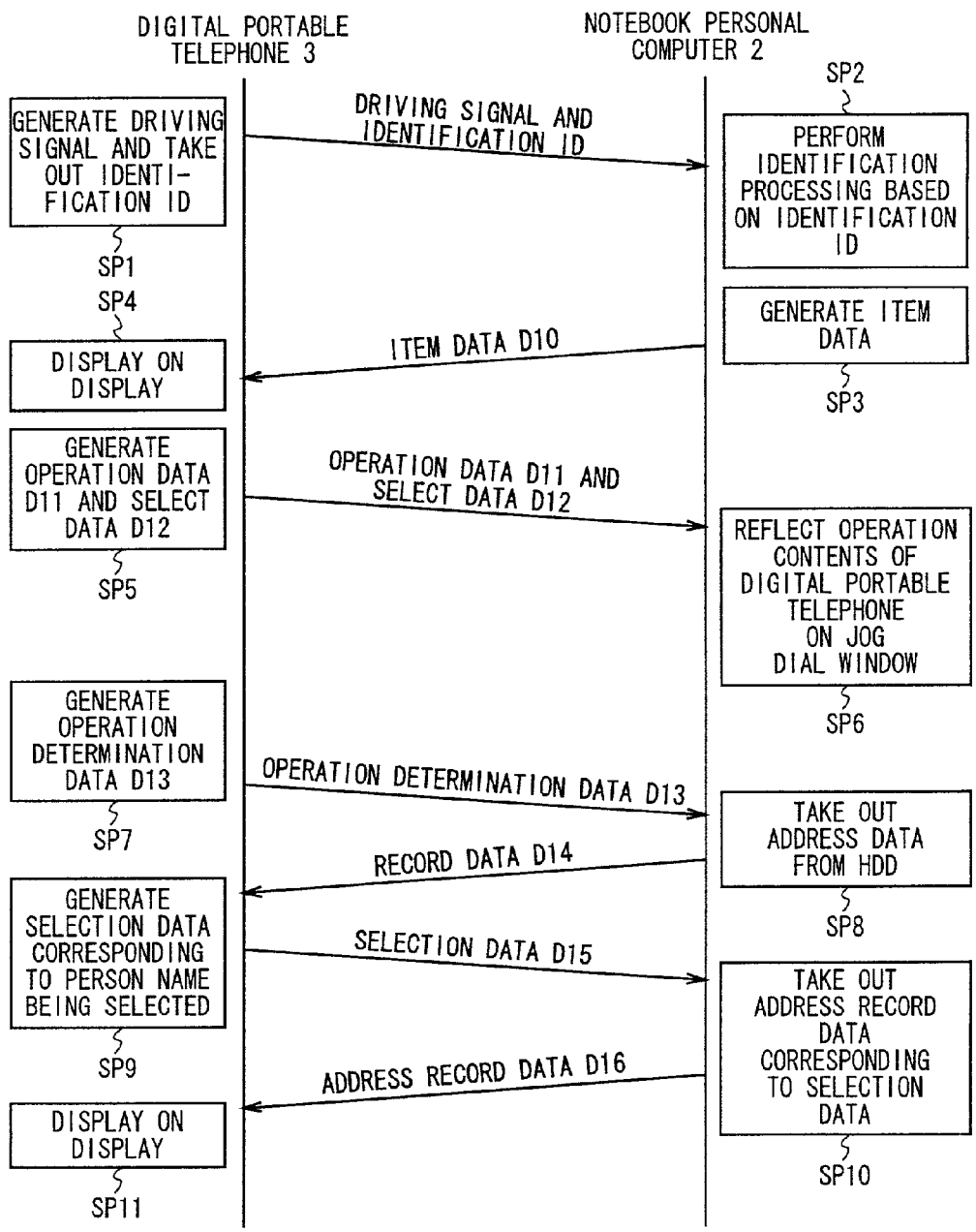
FIG. 6 is a sequence chart showing remote control processing.

Next, FIG. 6 shows a sequence of remotely operating the notebook personal computer 2 with the digital portable telephone 3 in the information processing system 1.

As shown in FIG. 6, at step SP1 when the "remote control start key" is pressed, the CPU 20 of the digital portable telephone 3 generates a driving signal and also takes out an identification ID inherent to the digital portable telephone 3 from the EEPROM 21 and transmits them to the notebook personal computer 2 via the radio interface for short distance 24.

At step SP2, when the CPU 10 of the notebook personal computer 2 receives the driving signal from the digital portable telephone 3 via the radio interface for short distance 16, it starts in the case where it has been in an inactive mode, then takes out the identification ID (ID inherent to the previously registered digital portable telephone 3) stored in the HDD 14, and then judges whether it is identical to the identification ID received from the digital portable telephone 3.

Here, the CPU 10 of the notebook personal computer 2 compares the identification ID previously stored in the HDD 14 to the identification ID received from the digital portable telephone 3, and if the comparison result shows that they are not identical, it judges that the access has been improperly made by a third party which can not treat the various kinds of personal information stored in the HDD 14, and informs the digital portable telephone 3 which is a sender of the identification ID that the radio communication for short distance can not be accepted.

On the contrary, the CPU 10 of the notebook personal computer 2 compares the identification ID previously stored in the HDD 14 to the identification ID received from the digital portable telephone 3, and if the comparison result shows that they are identical, then it judges that the access has been properly made by a person which can treat various kinds of personal information stored in the HDD 14.

In this case, at step SP3 the CPU 10 of the notebook personal computer 2 generates item data D10 based on the setting contents (the E-mail item 71B and the address item 71E) set on the item setting screen 40 already described in FIG. 4, and then transmits it to the digital portable telephone 3 via the radio interface for short distance 16.

Figure 7A:
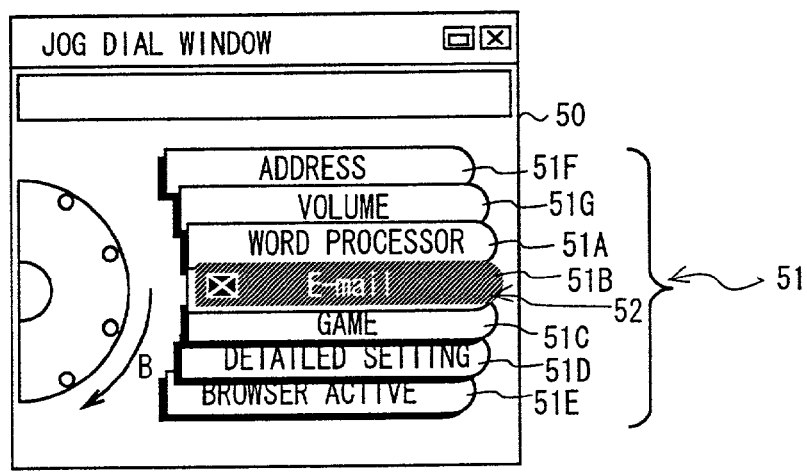
FIGS. 7A and 7B are schematic diagrams showing an operation state (1) between a menu screen of the digital portable telephone and a jog dial window of a notebook personal computer.

This time, the CPU 10 of the notebook personal computer 2 shifts the main menu items 51 so that the selector 52 is located on the E-mail item 51B out of the main menu items 51 on the jog dial window 50 as shown in FIG. 7A.

Figure 7B:
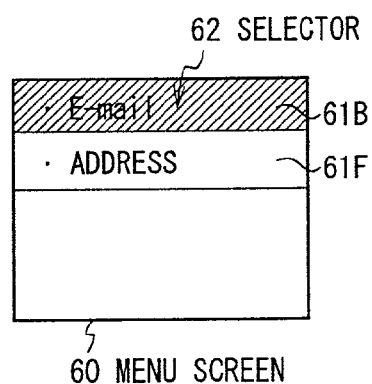

At step SP4, when the CPU 20 of the digital portable telephone 3 receives the item data D10 via the radio interface for short distance 25, it displays a menu screen 60 showing the E-mail item 61B and the address item 61F on the display 23 based on the received item data D10 as shown in FIG. 7B.

At this time, the CPU 20 of the digital portable telephone 3 places and displays the selector 62 shown by slant lines on the menu screen 60, on the E-mail item 61B, like the E-mail item 51B selected by the selector 52 on the jog dial window 50 of the notebook personal computer 2.

Figure 8A:
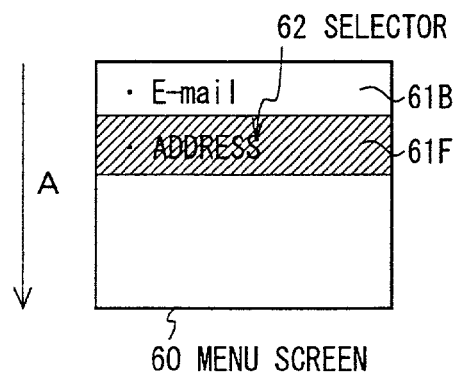
FIGS. 8A and 8B are schematic diagrams showing an operation state (2) between the menu screen of the digital portable telephone and the jog dial window of the notebook personal computer.

At step SP5 when the user rotates the jog dial 4 (FIG. 1), for example, by one click in the downward direction of the main case, the CPU 20 of the digital portable telephone 3 shifts and displays the selector 62 on the menu screen 60 by one item in the direction shown by the arrow A, as shown in FIG. 8A, and generates operation data D11 representing the operation contents (one-item shift in the direction shown by the arrow A) as well as generating select data D12 corresponding to the item name (address) being selected, and then transmits them to the notebook personal computer 2 via the radio interface for short distance 25.

Figure 8B:
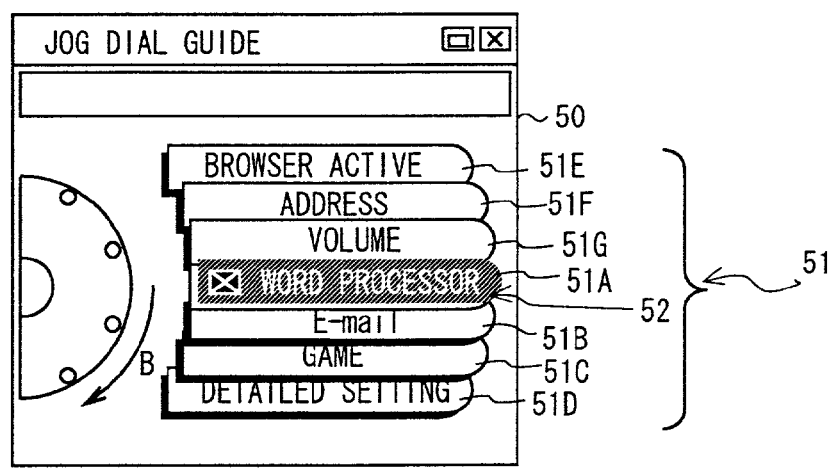

At step SP6 when the CPU 10 of the notebook personal computer 2 receives the operation data D11 and the select data D12 via the radio interface for short distance 16, it shifts, based on the received operation data D11, the menu items 51 on the jog dial window 50 by one item in the direction shown by the arrow B, as shown in FIG. 8B.

At this time, the CPU 10 of the notebook personal computer 2 judges whether one-item shift in the direction shown by the arrow B makes the menu item name ("word processing unit" in this case) being selected by the selector 52 identical to the item name (that is, "address") of the select data D12. At this time, when it is not identical to the item name (that is, "address") of the select data D12, then the CPU 10 of the notebook personal computer 2 shifts the main menu items 51 on the jog dial window 50 in the direction shown by the arrow B until it is identical to the item name (that is, "address") of the select data D12.

Figure 9A:
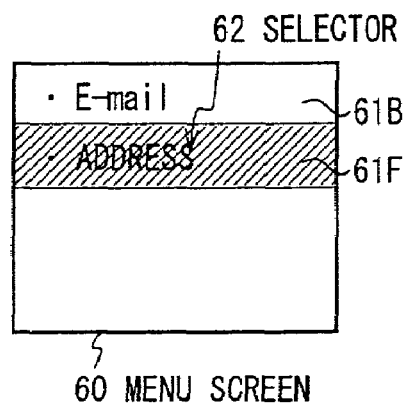
FIGS. 9A and 9B are schematic diagrams showing an operation state (3) between the menu screen of the digital portable telephone and the jog dial window of the notebook personal computer.
Figure 9B:
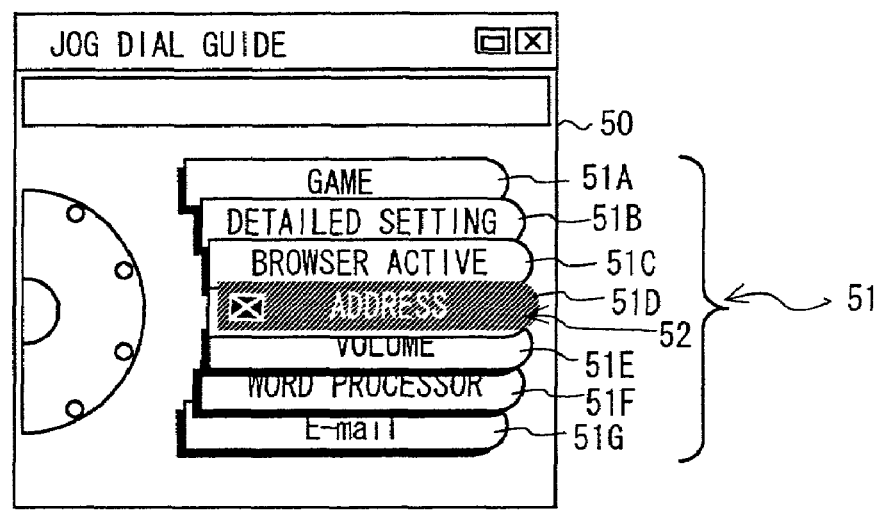

In this way, the same operation as the operation contents of the digital portable telephone 3 reflects on the jog dial window 50 of the notebook personal computer 2, as shown in FIGS. 9A and 9B.

As described above, the digital portable telephone 3 transmits the operation contents in the form of the operation data D11 and select data D12 every time when the jog dial 4 (FIG. 1) is operated, and the notebook personal computer 2 can execute the rotation display on the jog dial window 50, associated with operations of the digital potable telephone 3.

At step SP7 when the user pushes the jog dial 4 (FIG. 1) while the address item 51F is being selected (FIG. 9B), the CPU 20 of the digital portable telephone 3 generates operation determination data D13 corresponding to the operation contents (pushing operation) and transmits it to the notebook personal computer 2 via the radio interface for short distance 25.

At step SP8, when the CPU 10 of the notebook personal computer 2 receives the operation determination data D13 via the radio interface for short distance 16, it takes out the address data which is personal information, from the HDD 14, in accordance with the received operation determination data D13, opens the taken address data on the RAM 11 to display the address database on the HDD 14.

Then, the CPU 10 of the notebook personal computer 2 extracts only a record of the person names, from the taken address data, and transmits it as record data D14 to the digital portable telephone 3 via the radio interface for short distance 16.

At step SP9 when the CPU 20 of the digital portable telephone 3 receives the record data D14 via the radio interface for short distance 25, it marshals and displays the person names on the display 23 based on the received record data D14.

The CPU 20 of the digital portable telephone 3 scrolls the marshaled person names in accordance with the rotation operation of the jog dial 4 (FIG. 1) with the person names marshaled and displayed on the display 23.

When the user selects a desired person name of which the address he/her wants to know, with the selector 62 by the pushing operation, the CPU 20 of the digital portable telephone 3 generates selection data D15 corresponding to the person name being selected and transmits this to the notebook personal computer 2 via the radio interface for short distance 25.

At step SP10 when the CPU 10 of the notebook personal computer 2 receives the selection data D15 via the radio interface for short distance 16, it takes out address record data D16 corresponding to the received selection data D15 from the address database in the HDD 14, and then transmits it to the digital portable telephone 3 via the radio interface for short distance 16.

At step SP11 when the CPU 20 of the digital portable telephone 3 receives the address record data D16 via the radio interface for short distance 25, it displays the address based on the received address record data D16 on the display 23.

In this way, the digital portable telephone 3 receives the address record data D16, which is desired by the user, taken out from the HDD 14 of the notebook personal computer 2, via the radio interface for short distance 25, and visually displays this as an address on the display 23, thereby informing the user of the address of the desired person, without directly operating the notebook personal computer 2.

Therefore, the digital portable telephone 3 can function as a remote controller for remotely operating the notebook personal computer 2, by only pressing the remote control start key by the user.

(3) Operation and Effects of the Embodiment

According to the aforementioned configuration, in the information processing system 1, the digital portable telephone 3 receives function item information representing various functions of the notebook personal computer 2 which is to be operated, from the notebook personal computer 2, and displays a menu screen 60 based on the received function item information, thereby informing a user of the function item names representing the various functions of the notebook personal computer 2.

Thereby the user who operates the digital portable telephone 3 sees the menu screen 60 (the E-mail item 61B and the address item 61F) being displayed on the display 23 of the digital portable telephone 3, thus easily recognizing the functions of the notebook personal computer 2 which can be remotely operated.

The digital portable telephone 3 generates a processing command (operation data D11, select data D12, operation determination data D13, selection data D15) corresponding to a function item name determined according to user's input operation using the operation means (the jog dial 4), and directly transmits it to the notebook personal computer 2 via the radio interface for short distance 16.

The notebook personal computer 2 receives the processing command (the operation data D11, the select data D12, the operation determination data D13, the selection data D15), which is transmitted from the digital portable telephone 3, and executes predetermined processing (step SP6, step SP8, step SP10) corresponding to the processing command.

Thereby, the user does not directly operate the notebook personal computer 2, the digital telephone 3 can be used for remotely operating the notebook personal computer 2 while making the user recognize the operation state of the notebook personal computer 2, thus it can function as a remote controller of the notebook personal computer 2.

According to the aforementioned configuration, in the information processing system 1, the notebook personal computer 2 can be remotely operated with the digital portable telephone 3 without having a wired connection to each other, thus making it possible to significantly improve operability for users.

(4) Other Embodiments

Note that, in the aforementioned embodiment, the case has been described where each item displayed on the menu screen 60 is operated with the jog dial 4 serving as an operation means. The present invention, however, is not limited to this and other various operation means, such as a compass key provided in a portable telephone to shift items in a right-left or an up-down direction, can be utilized, for example. In this case, the similar effects to the aforementioned embodiment can be obtained.

Further, in the aforementioned embodiment, the case has been described where the notebook personal computer 2 executes processing based on operation data D11 and selection data D12, associated with operation of the digital portable telephone 3, every time when receiving the operation data D11 and the selection data D12 transmitted from the digital portable telephone 3. The present invention, however, is not limited to this and the notebook personal computer 2 can store the operation data D11 and the select data D12 transmitted from the digital portable telephone 3 in the HDD 14 once, and can execute processing in the reception order based on the operation data D11 and the select data D12, which are stored in the HDD 14, when receiving operation determination data D13 of which the operation contents indicates the pushing operation (that is, the operation determination data D13 as an execution command).

In this case, finally, the notebook personal computer 2 performs the same processing as the contents indicating the operation of the digital portable telephone 3, without performing processing associated with the contents representing the operation of the digital portable telephone 3. Therefore, the notebook personal computer 2 can prevent consumption power occurred when the associated processing is performed one by one.

Furthermore, in the aforementioned embodiment, the case has been described where the digital portable telephone 3 uses the CPU 20, the radio interface for short distance 25, and the antenna 31 as function item information receiving means to receive function item information (item data D10) representing functions of the notebook personal computer 2 to be operated, which is directly transmitted from the notebook personal computer 2. The present invention, however, is not limited to this and the digital portable telephone 3 can use other various units to receive the function item information from the notebook personal computer 2.

Furthermore, in the aforementioned embodiment, the case has been described where the digital portable telephone 3 uses the CPU 20, the radio interface for short distance 25, the antenna 31 as a processing command transmitting means to directly transmit a processing command (operation data D11, select data D12, operation determination data D13, selection data D15) corresponding to function item information (item data D10), to the notebook personal computer 2 in accordance with the user's input operation. The present invention, however, is not limited to this and the digital portable telephone 3 can use other various units to directly transmit the processing command to the notebook personal computer 2.

Furthermore, in the aforementioned embodiment, the case has been described where the notebook personal computer 2 uses the CPU 10, the radio interface for short distance 16, the antenna 19 as a function item information transmitting means to directly transmit function item information (item data D10) representing the own functions to the digital portable telephone 3. The present invention, however, is not limited to this and the notebook personal computer 2 can use other various units to directly transmit function item information to the digital portable telephone 3.

Furthermore, in the aforementioned embodiment, the case has been described where the notebook personal computer 2 uses the CPU 10, the radio interface for short distance 16, the antenna 19 as a processing command receiving means to receive a processing command (operation data D11, select data D12, operation determination data D13, selection data D15) corresponding to the function item information (item data D10) directly transmitted from the digital portable telephone 3. The present invention, however, is not limited to this and other various units can be used to receive the processing command corresponding to the function item information directly transmitted from the digital portable telephone 3.

Furthermore, in the aforementioned embodiment, the case has been described where the CPU 10 is used as a control means to control a function corresponding to a processing command (operation data D11, select data D12, operation determination data D13, selection data D15) The present invention, however, is not limited to this and other various units can be used to control the function corresponding to the processing command.

Furthermore, in the aforementioned embodiment, the case has been described where the digital portable telephone 3 and the notebook personal computer 2 are connected by the radio communications system for short distance based on the Bluetooth. The present invention, however, is not limited to this and the digital portable telephone 3 and the notebook personal computer can be connected by another kind of radio communication means, such as a radio communication for short distance, like the wireless local area network (LAN) standardized by the Institute of Electrical and Electronics Engineers (IEEE) 802'11B, or an infrared ray communication standardized by the Infrared Data Association (IrDA).

Furthermore, in the aforementioned embodiment, the case has been described where the notebook personal computer 2 as an information processing device is remotely operated with the digital portable telephone 3 as a remote controller terminal. The present invention, however, is not limited to this and another kind of information processing device such as a desktop personal computer or a compact disk (CD) player can be remotely operated with another kind of remote controller terminal such as a personal digital assistant (PDA).

Furthermore, in the aforementioned embodiment, the case has been described where the CPU 10 of the notebook personal computer 2 executes the same processing as the contents of operation of the digital portable telephone 3 following the jog dial utility program previously stored in the HDD 14. The present invention, however, is not limited to this and a jog dial utility program can be stored in another kind of program storage medium (for example, a floppy disk) and the jog dial utility program can be installed in the notebook personal computer 2 via the program storage medium, in order to execute the same processing as the contents of operation of the digital portable telephone 3.

In this case, a semiconductor memory and a magnetic disc for temporarily or permanently storing a program, in addition to a package medium such as a floppy disk, and a digital video disc-read only memory (DVD-ROM) can be used as a program storage medium which is used for installing the jog dial utility program in the notebook personal computer 2 so that the digital portable telephone 3 execute the program. Further, a wired or radio communication medium such as a local area network, the Internet, or a digital satellite broadcasting can be utilized as a means for storing the jog dial utility program in the program storage medium and furthermore, storing can be performed via another kind of interface such as a router or a modem.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information processing system comprising:
a remote controller terminal; and
an information processing device;
wherein said remote controller terminal includes
a local wireless interface configured to communicate with said information processing device,
an input device configured to receive a request to remotely control said information processing device with said remote controller terminal, and configured to transmit information to a processor, said information required for generating a menu operation request, a selection request, and an operation determination request,
said processor configured to, upon the input device receiving a request to remotely control, transmit a driving signal and an identification ID to said information processing device;

wherein said information processing device includes a local user interface configured to receive a user input local to the information processing device selecting a subset of a plurality of item data available at the information processing device as previously set item data and associate the selected previously set item data with the identification ID of the remote controller terminal, and
the information processing device is configured to respond to said driving signal and said identification ID by verifying said identification ID has access according to registered ID information, and configured to, if access is permitted, transmit to said remote controller terminal previously set item data corresponding to the received identification ID;
said remote controller terminal further comprising a display unit configured to display said received previously set item data,
said remote controller terminal configured to correspond said menu operation request, said selection request, and said operation determination request with said previously set item data;
wherein said information processing device is configured to transmit requested information to said remote controller terminal after receiving said menu operation request, said selection request, and said operation determination request.

2. The information processing system of claim 1, wherein said input device is a jog dial configured to select said menu operation request and said selection request via a rotation operation, and select said operation determination request via a push operation.

3. The information processing system of claim 2, wherein said display unit is configured to display said previously set item data as a scroll display in accordance with said rotation operation and configured to display one of said item data which is a candidate for selection.

4. The information processing system of claim 1, wherein said operation determination request is transmitted separately from said menu operation request and said selection request.

5. The information processing system of claim 1, wherein said information processing device is configured to determine whether said menu operation request as processed by said information processing device corresponds with said received selection request.

6. The information processing system of claim 5, wherein said information processing device moves through a task menu until the task menu lists a selection in accordance with said received selection request.

7. The information processing system of claim 2, wherein said menu operation request and said selection request are transmitted every time the jog dial is operated.

* * * * *